United States Patent [19]
Kent et al.

[11] Patent Number: 5,305,941
[45] Date of Patent: Apr. 26, 1994

[54] DESOLDERING WICK

[75] Inventors: George M. Kent, Sierra Madre; William H. Strater, Fontana, both of Calif.

[73] Assignee: Plato Products, Inc., Industry, Calif.

[21] Appl. No.: 998,119

[22] Filed: Dec. 28, 1992

[51] Int. Cl.$^5$ .............................................. B23K 3/08
[52] U.S. Cl. ......................................... 228/19; 228/35
[58] Field of Search .................... 228/191, 264, 19, 35, 228/57

[56] References Cited

U.S. PATENT DOCUMENTS

| | | | |
|---|---|---|---|
| Re. 32,086 | 2/1986 | Spirig | 228/19 |
| 2,530,552 | 11/1950 | Stoddard, Jr. | 228/19 |
| 3,627,191 | 12/1971 | Hood, Jr. | 228/19 |
| 3,715,797 | 2/1973 | Jackson et al. | 228/19 |
| 3,726,464 | 4/1973 | Howell et al. | 228/19 |
| 3,941,283 | 3/1976 | Garbe | 222/187 |
| 4,746,050 | 5/1988 | Brown | 228/51 |
| 4,934,582 | 6/1990 | Bertram et al. | 228/191 |
| 5,072,874 | 12/1991 | Bertram et al. | 228/264 |
| 5,094,139 | 3/1992 | Forsha | 228/19 |

FOREIGN PATENT DOCUMENTS

| | | |
|---|---|---|
| 6431573 | 7/1987 | Japan . |
| 276271 | 5/1971 | U.S.S.R. . |
| 2082952 | 3/1982 | United Kingdom . |

*Primary Examiner*—Samuel M. Heinrich
*Attorney, Agent, or Firm*—Christie, Parker & Hale

[57] ABSTRACT

A desoldering wick is made from an elongated strip of woven wire mesh slit from a sheet of woven fabric. The wire mesh is folded longitudinally for forming a ribbon having a width less than the width of the strip and having multiple thicknesses of wire mesh with a plurality of spaces between adjacent layers of mesh. The surface of the wire mesh is wettable by molten solder and may be coated with a solder flux for enhancing wetting. A variety of embodiments have folded woven fabric to make three or more thicknesses of wire mesh and are folded so that both slit edges of the strip are inside of the ribbon. Large area desoldering wicks are in the form a pad with a flat face and at least one edge folded approximately normal to the flat face. A ribbon desoldering wick is mounted in an insulating tube for faciltating holding the wick.

29 Claims, 6 Drawing Sheets

DESOLDERING WICK

BACKGROUND

This invention relates to an improved wick for absorbing molten solder.

It is fairly common in the electronics industry to remove solder from a printed circuit board. This may be needed, for example, when a component has been removed and is to be replaced by a different component. The old solder may be removed to assure a reliable joint. For many years now solder has been removed by placing a copper braid on the solder and touching it with a hot soldering iron. Typically, the braid has a thin coating of flux and when the solder melts, it is drawn into the braid by capillary action.

Braid for desoldering is shown, for example, in U.S. Pat. Nos. 3,627,191, 3,726,464 and 3,715,797. In each of these, fine wires of copper or the like are braided together in the form of a tube. The tube is flattened to make a braided ribbon. In a braided ribbon, the wires all extend in the longitudinal direction along the tube. The individual wires are in rather close engagement, yielding a ribbon with a limited volume between wires within which solder may be drawn.

Technicians using the braid may therefore press on the end of the braid to cause it to buckle and open up additional void space. This, however, causes the ribbon to become wider, which may be undesirable in close spaces. An exemplary ribbon is only two or three millimeters wide, although wider ribbons may be used in some applications.

The tightness of the braid was recognized in U.S. Pat. No. 4,416,408 (Reissue No. 32,086) by Spirig, who illustrates an exemplary braided wire in FIG. 1. When the braid is buckled, as mentioned above, it does not form a fan as illustrated in the patent, but instead remains braided and simply becomes wider and more open. Spirig proposes knitting a desoldering wick with a strand of copper in a continuous helically-forming knitting machine to form a tubular open mesh structure which is subsequently flattened. Spirig states that although the illustrated wick is formed by knitting, "it might instead be formed by crocheting or alternatively an open mesh structure might be formed by weaving or indeed by braiding, providing the adjacent strands will not be contiguous and will instead provide open spaces for absorbing the molten solder". How adjacent strands can be non-contiguous is not explained.

Despite these teachings from more than a decade ago, a satisfactory desoldering wick has not been made by any technique except braiding. The reason for this is not known, but it may be a matter of economics, or it may not be feasible to make a satisfactory wick by knitting. A knit wick may be too open to soak up an adequate amount of solder.

It is desirable, therefore, to produce a desoldering wick which can be made economically and reliably, which can absorb more solder than conventional braid, and which can absorb solder more quickly.

BRIEF SUMMARY OF THE INVENTION

There is therefore provided in practice of this invention, according to a presently preferred embodiment, a desoldering wick is in the form of a pad made from wire mesh. The surface of the wire mesh is wettable by molten solder. The pad has multiple layers of wire mesh, and a plurality of spaces between adjacent layers of the wire mesh for receiving molten solder drawn into the pad by the wire mesh.

In a preferred embodiment, the pad is in the form of an elongated ribbon. The ribbon is formed from a strip having multiple longitudinal folds for forming a ribbon having a width less than the width of the strip and having multiple thicknesses of wire mesh. In a particularly preferred embodiment, there are four thicknesses of wire mesh in the ribbon which is folded so that both edges of the strip are inside the ribbon.

In other embodiments, the pad has a large flat face and at least one edge folded approximately normal to the flat face. The pad may also be formed as a frame with a generally rectangular opening.

BRIEF DESCRIPTION OF THE DRAWINGS

These and other features and advantages of the present invention will be appreciated as the same becomes better understood by reference to the following detailed description when considered in connection with the accompanying drawings wherein.

DESCRIPTION

Figure 3:
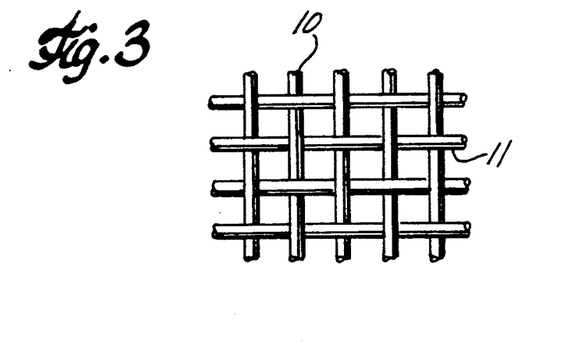
FIG. 3 illustrates a fragment of a woven wire mesh suitable for practice of this invention.
Figure 4:
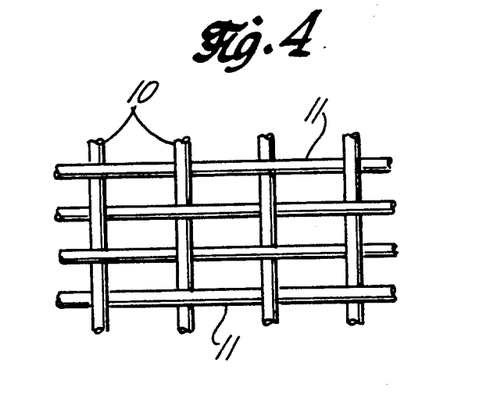
FIG. 4 illustrates a fragment of another embodiment of woven wire fabric where the warp and weft spacings of the mesh are different from each other.

The preferred raw material for making a desoldering wick in practice of this invention is a woven fabric of material wettable by molten solder. Woven fabric refers to a mesh made in a loom having warp fibers 10 extending in a longitudinal direction and weft (or fill) fibers 11 extending in the transverse direction. Such a woven fabric may be a symmetrical box weave as illustrated in FIG. 3 or the warp and weft fibers may be spaced apart by different distances to make an asymmetrical weave as illustrated in FIG. 4. Other weaves such as a twill (over two strands, under one, over two, under one, etc.) will be apparent to those skilled in the art. The warp and weft wires may also differ, that is, one of the wires may be a different size than the other wires.

In such a wire fabric, the warp and weft fibers are in engagement with each other. The weft fibers are spaced apart from each other. The warp fibers are also spaced apart from each other, thereby leaving generally rectangular spaces between the wires. The shape of the openings is not critical, and the warp and weft fibers may also be somewhat skewed and still considered to be "generally rectangular". The openings through the wire mesh provide a volume within which molten solder can be absorbed. The width of the openings is no more than sufficient for bridging across the open spaces by molten solder. In other words, the openings are not so large that when the wick has absorbed molten solder there is any appreciable volume which is not filled.

A woven wire mesh or fabric is made with substantial width; tens of centimeters or more. It is because of such substantial width that a large area of wire mesh can be made economically. In an exemplary embodiment a desoldering wick is made from a narrow strip of woven wire mesh slit from the fabric in the warp direction. The mesh can be slit in a conventional rotary slitter. It has been found that a single strip of wire mesh has limited ability to soak up much solder.

Figure 2:
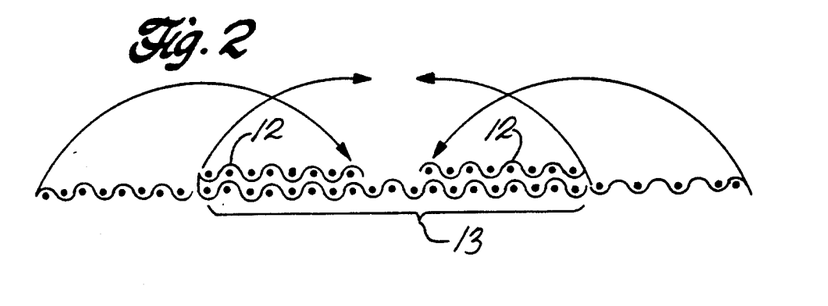
FIG. 2 illustrates schematically one embodiment for folding of the wire mesh used for forming the wick.

Such a strip is therefore folded as illustrated in FIG. 2. A band 12 about one fourth of the width of the strip along each slit edge is folded toward the middle of the strip. If desired, the folds may be crimped. Next, the middle half 13 of the strip is folded as indicated by the arrows in FIG. 2 to form a ribbon 14 which has four thicknesses of wire mesh and is about one-fourth as wide as the original slit strip. A slight gap is left between the slit edges of the strip after the first folds to leave sufficient material for making the fold in the middle of the strip. Passing the ribbon through the nip of finishing rolls produces a flat ribbon of substantially uniform thickness.

With such an arrangement, the slit edges which might be susceptible to raveling are each folded into the inside of the ribbon, so that any loose pieces of wire that might tend to come loose are retained and do not catch on projections or contaminate areas where the desoldering wick may be used.

The resultant ribbon has three spaces between the layers of wire mesh. It is believed that the enhanced ability to absorb molten solder may be due to the multiple spaces between layers of wire mesh. Conventional braided desoldering wick has, at most, one space between adjacent layers since it is made in the form of a tube and flattened. The same is true of the knit tube described in the Spirig patent.

The wire mesh adjacent to the spaces has wires extending transverse to the direction of solder flow, that is, transverse to the length of the desoldering wick, as well as wires extending along the length of the wick. These assure that the entire cross section of the wick becomes filled with molten solder, enhancing the total volume of solder absorbed.

Preferably the wire mesh fabric is slit approximately parallel to the warp fibers of the mesh so that the longer warp fibers extend longitudinally along the desoldering wick. This is advantageous for a manufacturing process which employs roll forming. The strip is slit and then passes through a sequence of rolls which form the respective bends in sequence for forming a narrower ribbon from the strip. The ribbon is passed between pinch rolls for flattening, before being wound on spools or packaged for sale.

If desired, a strip may be cut from a wire fabric in a direction transverse to the warp. For example, successive cuts may be made parallel to the weft fibers in the fabric. Alternatively, cuts may be made in a bias direction for minimizing raveling of the fabric.

For an embodiment where desoldering wick is sold in bulk, the strip slit from the woven wire mesh is at least an order of magnitude longer than it is wide and the ribbon is at least two orders of magnitude longer than it is wide. The ribbon is typically several orders of magnitude longer than wide. For example, a common package has a ribbon of desoldering wick with a length 800 times its width. When such a desoldering wick has a thickness of four layers of wire mesh, the length of the slit strip is 200 times the width of the strip. As the strip is being manufactured, the length may be several orders of magnitude greater than the width, however, the long ribbon may be chopped into shorter lengths for sale and convenience of use.

Figure 5:
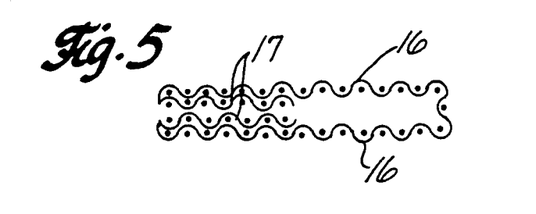
FIG. 5 illustrates another embodiment of desoldering wick in transverse cross-section.

A woven wire mesh with a relatively wider spacing between the warp fibers than the weft fibers, as illustrated in FIG. 5, may be advantageous for a couple of reasons. The wider spacing of the warp wires is transverse to the length of the ribbon when slit from the fabric. The weft fibers remain close together for drawing solder longitudinally along the wick. Thus, there is additional space between warp fibers for holding solder, thereby increasing the volume of solder that can be absorbed. Furthermore, the somewhat wider spacing can facilitate folding of the strip parallel to the warp fibers for forming a ribbon.

Although a ribbon with three longitudinal folds and four thicknesses of wire mesh is preferred, it will be apparent that other arrangements may also be satisfactory. For example, for some applications two folds to yield three thicknesses of wire mesh and only two spaces between layers may be sufficient. This, however, leaves one slit edge on the outside of the ribbon. Clearly, additional layers of wire mesh may be added for a thicker desoldering wick and additional spaces between adjacent layers.

The material for forming the wire mesh has a surface that is wettable by molten solder. Preferred materials are copper wire and brass wire. These materials are ductile for drawing into fine wire, weaving and folding. They are also readily wetted by solder when used with a flux coating. Other suitable materials include copper coated steel, bronze, and a metal such as copper, brass, bronze, or steel which is "tinned" with tin or tin bearing alloy. Preferably the surface of the wire has a thin coating of solder flux, although in some embodiments the flux may be omitted. Copper is presently a preferred material.

Figure 1:
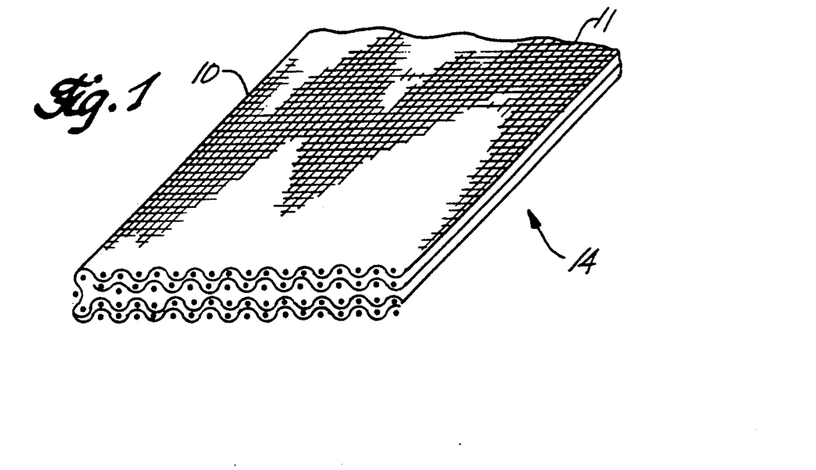
FIG. 1 illustrates an end portion of an elongated desoldering wick.

In an exemplary embodiment, a symmetrical box weave 145 mesh screen of copper wires was made into a desoldering wick. A 145 mesh screen has square openings about 0.1 millimeter across. A strip about a centimeter wide was cut from the wire mesh parallel to one set of wires and folded longitudinally with three folds to form four thicknesses of wire mesh as illustrated in FIGS. 1 and 2. The resultant ribbon was flattened to a total thickness of about 0.6 to 0.7 millimeter and had a width of about 2.5 millimeters. Such a ribbon soaked up two to three times as much solder when the end was dipped into a solder pot as did a prior art braided wick having a thickness of 0.5 millimeter and width of 2.5 millimeters. In addition to soaking up a larger volume of solder, it appeared that the solder moved up the wick more quickly than in the braided wick.

Although 145 mesh woven fabric has proved satisfactory for the thin narrow ribbon mentioned, other dimensions of woven wire fabric may also be used. For example, conventional 270 mesh, 200 mesh and 100 mesh woven wire fabrics may be used to produce different thicknesses and widths of desoldering wick.

After the wire mesh fabric is folded, it is run through pinch rolls for flattening the ribbon. If the ribbon is pinched too hard, the layers are pressed together too tightly so that some of the void spaces in which solder can flow are closed, thereby reducing the volume of solder that can be absorbed by the wick. On the other hand, if the ribbon is not pinched enough, the successive layers of wire mesh may be spaced so far apart that solder does not bridge across the gap between layers. This may also reduce the volume that can be absorbed, by reducing the length of ribbon into which solder is drawn by capillary action.

Thus, it is significant that the wire mesh layers are sufficiently close to each other to draw molten solder along the length of the ribbon, yet far enough apart to leave sufficient open space to accommodate an increased volume of solder as compared with a prior art braid. Suitable dimensions for different embodiments for absorbing an optimum amount of solder can be readily determined by rolling a series of samples between rolls with adjustable spacing.

As one example, with 145 mesh copper box weave fabric, is rolled to form a ribbon having four layers of wire mesh with three spaces between the adjacent layers. The ribbon has a total thickness in the range of from 0.6 to 0.7 millimeter for optimum absorption of solder.

The spacing between layers in the ribbon need not be uniform in all portions of the ribbon. Thus, for example, a light weight ribbon may be made by folding a strip to have a cross-section as illustrated in FIG. 5. In this embodiment, the strip is folded into a closed V in substantially the same way as the embodiment in FIGS. 1 and 2, except that each arm of the V has a double thickness of woven mesh over only a portion of its length, rather than essentially the entire ribbon as illustrated in FIG. 1 The outer layers 16 extend the full width of the ribbon. The inner layers 17 are folded near each edge of the strip extending only part way across the width of the ribbon. Thus, at one edge the ribbon has a total thickness of four layers and adjacent to the opposite has a thickness of only two layers. This type of folding assures that the slit edges of the strip are folded inside the ribbon. The multiple spaces between adjacent layers of the mesh assure that ample solder is drawn into the wick.

Figure 6:
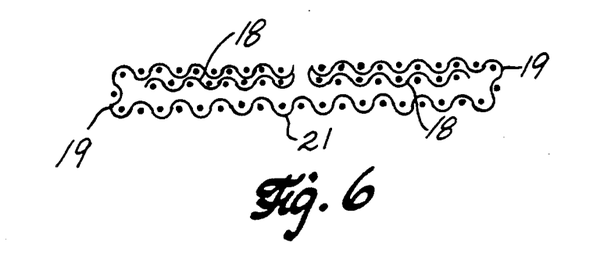
FIG. 6 illustrates still another embodiment of desoldering wick in transverse cross-section.

FIG. 6 illustrates in transverse cross-section another embodiment of folded woven wire mesh for producing a desoldering wick having a thickness of three layers of wire mesh with the slit edges of the strip on the inside of the ribbon. A band 18 of the strip along each edge, about 1/6 of the width of the strip, is folded 180°. Another 180° fold 19 is made at about ⅓ of the width of the strip from each edge. The center third of the strip is left flat. The resulting cross-section is, in effect, two flat spirals joined in the middle of the strip and extending in opposite directions. Each slit edge of the strip which might ravel is trapped inside the ribbon.

Figure 7:
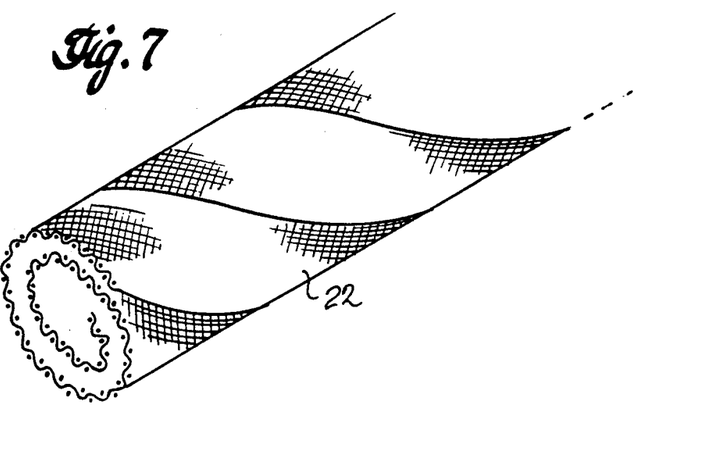
FIG. 7 illustrates schematically an end portion of a coiled tube embodiment of desoldering wick.

FIG. 7 illustrates an intermediate step in the formation of another embodiment of desoldering wick made from woven wire mesh fabric. In this embodiment, a strip 22 of wire mesh fabric is wound helically for forming a hollow cylinder. The pitch of the helix is one half of the width of the strip, so that the strip overlaps itself on half of its width as the helix is formed. Thus, throughout its length, the wall of the tube formed has a double thickness of wire mesh.

Figure 8:
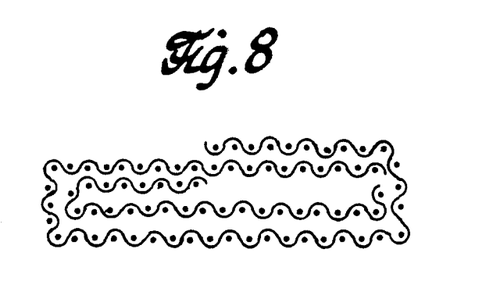
FIG. 8 illustrates a transverse schematic cross-section of an embodiment of desoldering wick in the form of a flattened spiral.

The tube is then run through pinch rolls which flatten the tube into a ribbon having a thickness of four layers of mesh substantially as illustrated in FIG. 8. The edge of the strip wraps around the flattened ribbon instead of always being at the location illustrated.

A cross-section similar to that illustrated in FIG. 8 can also be produced from a flat strip by curling it longitudinally for forming a tube and then flattening the tube into a ribbon. In either such embodiment, one edge of the strip is within the ribbon and the other edge extends along the outside of the ribbon.

An arrangement where a strip is rolled or coiled into a tube and then flattened leaves one edge of the strip on the outside. This technique is appropriate for making a desoldering wick where the layer of mesh fabric has a selvage along the edge of the strip that is on the outside. Otherwise, the small wires of the wire mesh may unravel. It may also be used where the fabric is slit on the bias to inhibit raveling. Such an embodiment may also be made by first folding a slit edge of the woven wire mesh and then rolling or coiling the strip into a tube with the slit edge hidden within the wall of the tube.

Making a desoldering wick from fabric narrow enough to employ the selvage along an outside of the ribbon may be uneconomic because of the narrow width of the woven fabric. It is therefore preferred to use a strip of woven wire mesh without a selvage, and preferably folded so that the slit edges of the strip are folded inside the ribbon.

While woven wire mesh is preferred because of its availability and price, other analogous materials may be used. For example, suitable mesh may be formed by welding wires, plating a wire mesh, etching or perforating or expanding sheet material. Multiple spaces between layers of mesh may also be formed from knitted or crocheted tubes, or even loosely braided tubes. Such a tube may be flattened and folded, for example, to form four thicknesses of mesh and three spaces. Alternatively, one may form concentric tubes which are then flattened to form multiple thicknesses of wire mesh.

An alternative manufacturing technique is to slit multiple flat layers of metal mesh stacked one upon another, and weld the cut edges by resistance or laser welding for forming a ribbon with multiple spaces between adjacent layers. The edges of adjacent layers of wire mesh may also be secured together by crimping.

As mentioned above, desoldering wick is often sold in packages having coils of ribbon of substantial length. For example, one embodiment employing copper braid has a width of about 3 millimeters and a length of about 1.5 meters coiled into a disk-shaped plastic package. This may not always be the most convenient way for a desoldering braid to be used. Much shorter straight pieces may be more convenient for some tasks. Convenient new packaging for a hand-held desoldering wick is therefore illustrated in FIGS. 9 and 10.

Figure 10:
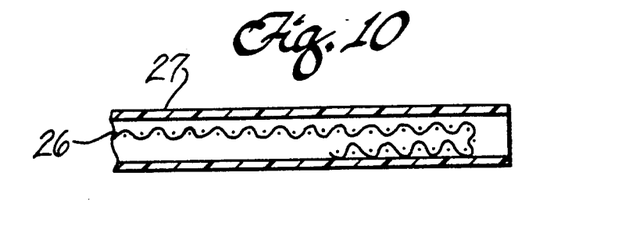
FIG. 10 is a fragmentary longitudinal cross section of the folded end of the desoldering wick within the tube as shown in FIG. 9.

In this embodiment the desoldering wick is in the form of a ribbon 26 of wire mesh about 3 millimeters wide and about 12 to 15 centimeters long. The ribbon fits into a somewhat flattened plastic tube 27 which is slightly shorter than the ribbon so that one end of the ribbon protrudes from the end of the plastic tube. The other end of the ribbon is folded over to have double thickness as seen in FIG. 10. The double thickness of ribbon fits more tightly into the plastic tube than the single thickness of ribbon (the single thickness may, of course, comprise multiple layers of wire mesh). This somewhat tighter fit in the tube provides a frictional engagement between the tube and ribbon. This frictional engagement is sufficiently tight that the ribbon does not fall out of the tube, but there is a sufficiently light engagement that the ribbon can be pulled from the tube for use.

Figure 9:
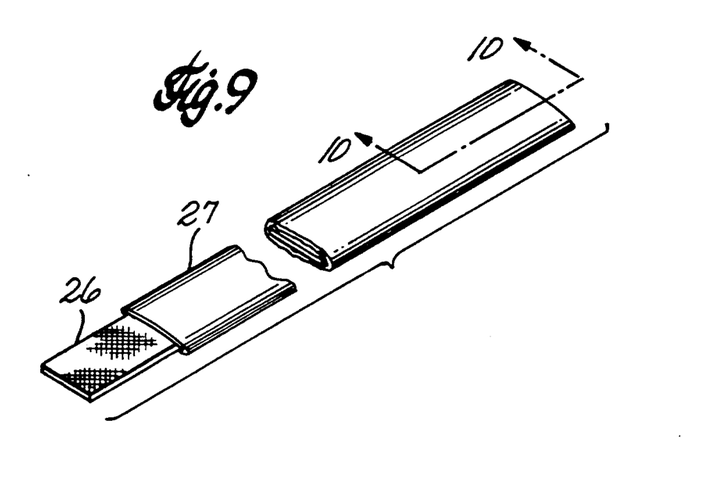
FIG. 9 illustrates another embodiment of desoldering wick in the form of a non-wettable tube enclosing a wettable ribbon.

Such an embodiment is used much as one might use a pencil, touching the tip of the ribbon to the area to be desoldered. The plastic tube around the ribbon enables the user to hold the desoldering wick comfortably even as molten solder is drawn into the wick. The thermal insulation provided by the plastic prevents burnt fingers. It does not appear to be necessary to use particularly high melting point plastic for the tube. The first embodiment of the hand-held desoldering wick was made by inserting conventional desoldering braid into a typical hollow plastic coffee stirrer. The wick could be used without melting of the plastic unless the plastic was actually touched with the hot tip of a soldering iron.

If desired, a small metal sleeve may be provided at or on the end of the plastic tube for minimizing the likelihood of melting due to inadvertent contact with a hot soldering iron tip.

Figure 11:
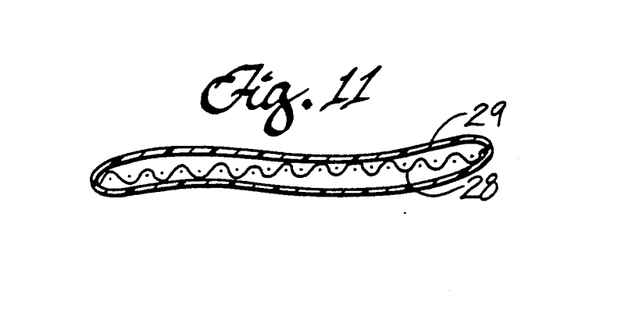
FIG. 11 illustrates still another embodiment of desoldering wick in transverse cross-section.

FIG. 11 illustrates in transverse cross section an alternative embodiment of hand-held desoldering wick having a copper wire mesh ribbon 28 in a plastic tube 29. The tube has a gentle S-shaped cross section which engages the more or less flat desoldering ribbon for lightly frictionally maintaining the ribbon within the tube. A variety of such cross sections may be devised for frictionally engaging the desoldering ribbon, instead of folding over an end of the ribbon as described and illustrated in FIGS. 9 and 10.

Figure 12:
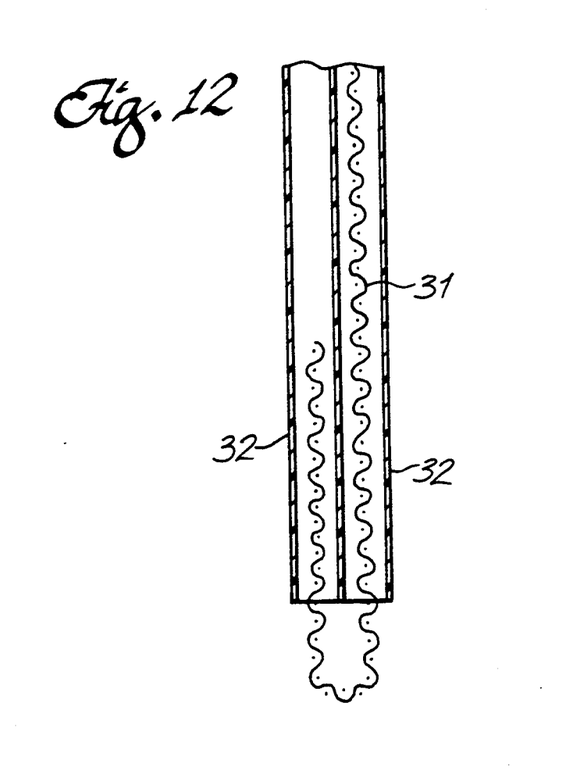
FIG. 12 illustrates schematically an end portion of a twin tube embodiment of desoldering wick.

When such a hand-held desoldering wick is used, the operator typically draws solder into the wick for several millimeters and then either snips off the end of the ribbon filled with solder or folds the end away from the point of contact so that additional solder can be absorbed further along the length of the wick. FIG. 12 illustrates an embodiment of hand-held desoldering wick for use in the latter manner.

In this embodiment a desoldering ribbon 31 fits into two parallel tubes 32, for example, a tubular body having a figure-8 cross section with the opposite ends of the ribbon inserted into the respective tubes. With such an arrangement the desoldering ribbon is pulled out of one tube for removing solder from a printed circuit board or the like. The ribbon loaded with solder is pushed into the adjacent tube. The operator essentially moves along the length of the desoldering wick by pulling fresh wick from one tube and pushing the spent wick into the other tube. This avoids pieces of debris from snipped off ends of desoldering wick.

Figure 13:
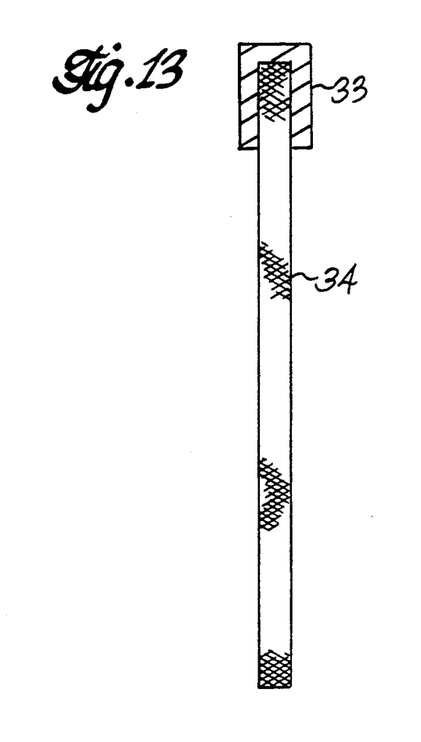
FIG. 13 illustrates another embodiment of desoldering wick with an insulating "handle"

It is not always necessary to have a hand-held desoldering wick with an insulating "handle" extending the full length of the ribbon. A small portion of thermal insulation at one end may be enough. Such an embodiment is illustrated in FIG. 13 where a short cylinder of insulating plastic 33 is molded on the end of a desoldering ribbon 34. The relative lengths of the "handle" 33 and ribbon 34 may be varied as desired to be suitable for specific uses.

Figure 14:
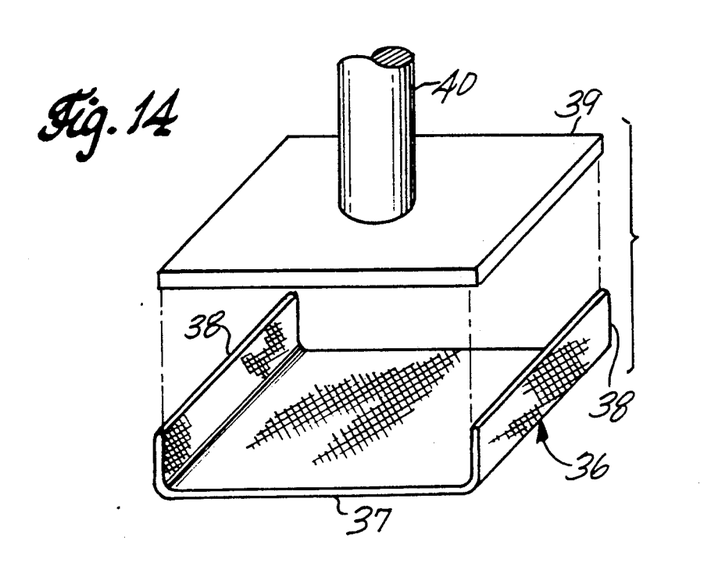
FIG. 14 illustrates another embodiment of desoldering wick in the form of a pad with upturned edges for engaging a soldering iron tip.
Figure 15:
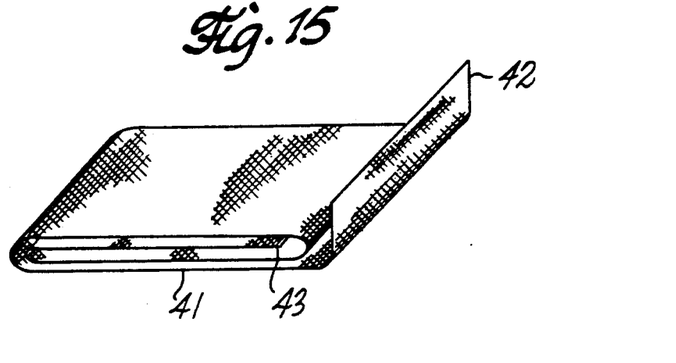
FIG. 15 is an isometric view of still another embodiment of desoldering wick or pad.

FIGS. 14 and 15 illustrate embodiments of desoldering devices for removing solder from areas somewhat larger than areas desoldered by the ribbons hereinabove described and illustrated. These embodiments are in the form of pads that can engage a relatively large area of solder. In the embodiment illustrated in FIG. 14, the pad 36 comprises a rectangular face 37 for engaging solder to be removed. Two opposite edges 38 are folded up approximately normal to the face of the pad. The spacing between the upturned edges corresponds approximately to the width of a plate 39 on the end of a tip 40 which fits into a conventional soldering iron. Preferably the plate is made of a non-wetting metal such as stainless steel or is covered with chromium plating or the like so that it is not wetted by molten solder.

The desoldering pad 36 is placed against the plate and the upturned edges are bent inwardly slightly to fit over the plate and hold the pad in place. Only a slight band is needed for holding the light weight pad on the plate. The pad with a heated plate is then pressed against the area to be desoldered and molten solder is drawn into the pad. Once filled with solder one of the edges 38 can be slightly bent away for removing the pad from the plate.

The desoldering pad illustrated in FIG. 14 may be made from a variety of solder-wettable materials. Preferably it comprises a plurality of layers of wire mesh providing multiple spaces between the layers for absorbing a substantial amount of molten solder. One or two sheets of wire mesh, a wide area of wire braid, or other solder-wettable fabric may be used for forming the desoldering pad. Since there are a number of ways of forming the pad it is illustrated schematically without separately showing the mesh or multiple layers.

One way of forming such a pad is suggested in the embodiment illustrated in FIG. 15. In this arrangement a pad is formed by folding a sheet of wire mesh three times to form a flat face 41 for absorbing molten solder from an appreciable area. An edge 42 is folded up approximately normal to the face for forming a tab for handling the desoldering wick.

This embodiment of desoldering wick is placed on an area of solder to be removed and heated with a conventional soldering iron on the opposite face. When the desired solder has been absorbed in the desoldering wick, forceps are used for grasping the tab and lifting the desoldering wick from the surface being desoldered. Such a desoldering pad may be made with one cut edge 43 folded inside the face of the desoldering wick and another cut edge in the tab 42 where it does not engage the area being desoldered. Clearly, a pad with both opposite edges folded up, as illustrated in FIG. 14, could be used in the same manner.

Figure 16:
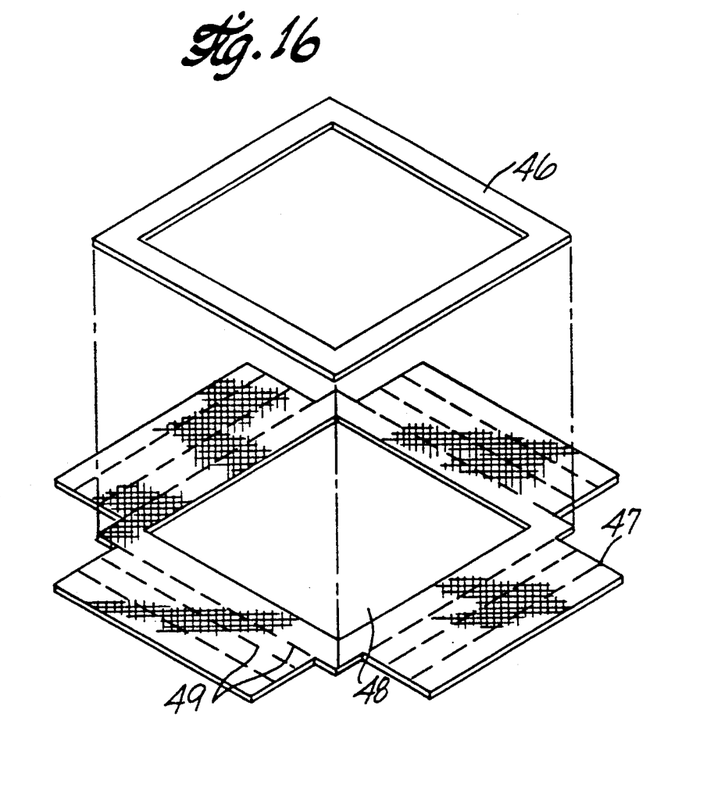
FIG. 16 illustrates schematically the shape of a piece of wire mesh for folding to form another embodiment of desoldering wick or frame.

FIG. 16 comprises an exploded view of an embodiment of desoldering wick for removing solder from leads around an integrated circuit package, for example. This desoldering wick comprises a thin sheet metal frame 46 and a cruciform sheet of wire mesh 47. The wire mesh has a central opening 48 corresponding in size and shape to the generally rectangular opening through the frame. The frame is placed on the wire mesh and each arm of the sheet of mesh is folded around a side of the frame as indicated by the dashed lines 49 on the mesh. By wrapping these arms around the wire frame, one forms a pad having multiple thicknesses of wire mesh on each face of the frame. An arrangement as illustrated in FIG. 16 would have two thickness of wire mesh on each face. By making the arms longer and with more folds, additional layers of wire mesh may be provided.

Such a desoldering frame is used by placing it on the leads for a multi-lead component or the like or other area to be desoldered and then heated with a soldering iron. The metal frame in the desoldering wick permits each face to be used for absorbing molten solder.

An alternative arrangement of frame-shaped desoldering wick may be made by folding a wire mesh sheet 47 along the dashed lines 49 without inclusion of a sheet metal frame. Solder absorbed into such a desoldering frame may soak into the entire volume of the wick from one face.

As with the desoldering ribbon, the desoldering pads may be pre-coated with a thin layer of flux. Alternatively, flux may be applied to the solder to be removed. Also, as with the desoldering ribbon, the larger area pads are preferably made of woven wire mesh, but may instead be made of welded wire mesh, expanded metal, plated mesh, etc.

While several embodiments of desoldering wick made from wire mesh have been described and illustrated herein, many modifications and variations will be apparent to those skilled in the art. For example, other folding patterns may be used for forming a ribbon or sheet desoldering device. It is therefore to be understood that within the scope of the appended claims, this invention may be practiced otherwise than is specifically described.

What is claimed is:

1. A desoldering wick comprising:
    a pad comprising multiple layers of wire mesh, the surface of the wire mesh being wettable by molten solder;
    a plurality of spaces between adjacent wires in the wire mesh; and
    a plurality of spaces between adjacent layers of the wire mesh for receiving molten solder drawn into the pad by the wire mesh, and wherein
    the ribbon is made from a strip of wire mesh having at least some wires extending transverse to the length of the ribbon and comprising at least two longitudinal folds in the strip for forming a ribbon having a width less than the width of the strip, and having multiple thicknesses of wire mesh and at least two spaces between layers of wire mesh.

2. A desoldering wick as recited in claim 1 having at least three folds and wherein each edge of the strip is folded into the inside of the ribbon.

3. A desoldering wick comprising:
    a pad comprising at least three layers of wire mesh, the surface of the wire mesh being wettable by molten solder;
    a plurality of spaces between adjacent wires in the wire mesh; and
    a plurality of spaces between adjacent layers of the wire mesh for receiving molten solder drawn into the pad by the wire mesh.

4. A desoldering wick as recited in claim 3 wherein the pad comprises an elongated strip of wire mesh having a first band of the strip along each edge about one sixth of the width of the strip folded inwardly from the edge of the strip, and a second band of the strip between each first band and the middle of the strip having a width of about one sixth of the width of the strip folded toward the middle of the strip, the center third of the strip being flat.

5. A desoldering wick comprising:
    a pad comprising at least four layers of wire mesh, the surface of the wire mesh being wettable by molten solder;
    a plurality of spaces between adjacent wires in the wire mesh; and
    a plurality of spaces between adjacent layers of the wire mesh for receiving molten solder drawn into the pad by the wire mesh.

6. A desoldering wick comprising:
    a pad comprising multiple layers of wire mesh, the surface of the wire mesh being wettable by molten solder;
    a plurality of spaces between adjacent wires in the wire mesh; and
    a plurality of spaces between adjacent layers of the wire mesh for receiving molten solder drawn into the pad by the wire mesh wherein
    the pad comprises an elongated strip having a band about one fourth of the width of the strip along each edge of the strip folded toward the middle of the strip and a fold in the middle of the strip to form a ribbon which has four thicknesses of wire mesh and is about one fourth as wide as the original strip.

7. A desoldering wick comprising:
    a pad comprising multiple layers of wire mesh, the surface of the wire mesh being wettable by molten solder;
    a plurality of spaces between adjacent wires in the wire mesh; and
    a plurality of spaces between adjacent layers of the wire mesh for receiving molten solder drawn into the pad by the wire mesh; and wherein
    the pad comprises an elongated strip folded so that both edges of the strip are inside the ribbon.

8. A desoldering wick comprising:
    a ribbon comprising wire mesh slit from a sheet of wire mesh fabric woven with a symmetrical box weave and folded to form multiple layers of wire mesh, the warp wires of the woven wire mesh fabric and at least one fold extending along the length of the ribbon, the surface of the wire mesh being wettable by molten solder;
    a plurality of spaces between adjacent wires in the wire mesh; and
    a plurality of spaces between adjacent layers of the wire mesh for receiving molten solder drawn into the ribbon by the wire mesh.

9. A desoldering wick comprising:
    a ribbon having multiple layers of wire mesh, the surface of the wire mesh being wettable by molten solder;
    a plurality of spaces between adjacent wires in the wire mesh; and
    a plurality of spaces between adjacent layers of the wire mesh for receiving molten solder drawn into the ribbon by the wire mesh; and wherein
    the wire mesh is a woven fabric with the warp having a different spacing between the wires than the spacing between the wires of the weft, and the wider spacing of warp and weft wires extends transverse to the length of the ribbon.

10. A desoldering wick comprising:

a pad comprising multiple layers of wire mesh, the surface of the wire mesh being wettable by molten solder;

a plurality of spaces between adjacent wires in the wire mesh; and a plurality of spaces between adjacent layers of the wire mesh for receiving molten solder drawn into the pad by the wire mesh; and wherein a transverse cross section of the ribbon is in the form of a flattened spiral.

11. A desoldering wick comprising:

a pad comprising multiple layers of wire mesh, the surface of the wire mesh being wettable by molten solder;

a plurality of spaces between adjacent wires in the wire mesh; and a plurality of spaces between adjacent layers of the wire mesh for receiving molten solder drawn into the pad by the wire mesh; and wherein a transverse cross section of the ribbon is in the form of a closed V wherein each arm of the V has a double thickness of wire mesh on at least a portion of its length.

12. A desoldering wick comprising:

a pad comprising multiple layers of wire mesh, the surface of the wire mesh being wettable by molten solder;

a plurality of spaces between adjacent wires in the wire mesh; and a plurality of spaces between adjacent layers of the wire mesh for receiving molten solder drawn into the pad by the wire mesh; and wherein the pad comprises a flat face and at least one edge folded approximately normal to the flat face.

13. A desoldering wick comprising:

at least three layers of wire mesh parallel to each other and having the edges of at least some of the layers secured together, wherein the wire mesh layers are sufficiently close to each other to draw molten solder parallel to the layers by capillary action, the spacing between adjacent layers being no more than sufficient for bridging between the adjacent layers by molten solder, each layer having open spaces within the layer, the open spaces being no more than sufficient for bridging across the open spaces by molten solder, whereby after wetting by molten solder, the wick is substantially completely filled with solder.

14. A desoldering wick as recited in claim 13 wherein the wire mesh is selected from the group consisting of woven wire mesh, knitted wire mesh, crocheted wire mesh, welded wire mesh, plated metal mesh, etched metal mesh, expanded metal mesh, and perforated metal mesh.

15. A desoldering wick as recited in claim 13 wherein the edges of adjacent layers are secured by folding a sheet of wire mesh.

16. A desoldering wick as recited in claim 13 wherein the edges of adjacent layers are secured by welding or crimping edges of sheets of wire mesh.

17. A desoldering wick as recited in claim 13 wherein the desoldering wick comprises a ribbon having a length at least an order of magnitude more than its width.

18. A desoldering wick comprising a pad with a flat face, at least one edge of the pad being folded approximately normal to the flat face, the pad comprising a plurality of layers of orthogonally woven solder-wettable wire mesh fabric sandwiched face-to-face, the spacing between adjacent layers being no more than sufficient for bridging between the adjacent layers by molten solder, each layer having warp fibers in engagement with weft fibers, adjacent warp fibers being spaced apart from each other and adjacent weft fibers being spaced apart from each other, leaving generally rectangular openings through the layer.

19. A desoldering wick in the form of a ribbon comprising a plurality of layers of orthogonally woven solder-wettable wire mesh fabric sandwiched face-to-face, the ribbon being cut from a sheet of such fabric and having all cut edges of the fabric folded inside the ribbon.

20. A desoldering wick comprising:

a ribbon of solder-wettable wires; and flattened insulating tube surrounding the ribbon, the cross section of the tube being substantially uniform along its length and sufficiently close to at least a portion of the cross section of the ribbon for frictionally engaging the ribbon throughout the length of the tube and preventing the ribbon from falling from the tube, but sufficiently loosely engaging the ribbon for readily withdrawing the ribbon from the tube.

21. A desoldering wick as recited in claim 20 comprising a folded portion of the ribbon inside the tube for frictionally engaging the inside of the tube.

22. A desoldering wick as recited in claim 20 wherein the ribbon comprises a plurality of layers of woven wire mesh.

23. A desoldering wick comprising:

a ribbon of solder-wettable wires;

an insulating tube surrounding the ribbon, the cross section of the tube being sufficiently close to at least a portion of the cross section of the ribbon for frictionally engaging the ribbon and preventing the ribbon from falling from the tube, but sufficiently loosely engaging the ribbon for readily withdrawing the ribbon from the tube; and a second tube parallel to and secured to the first tube, a portion of the ribbon being in each tube.

24. A method for making a desoldering wick comprising the steps of:

weaving a mesh of wire having warp and weft directions;

slitting the mesh for forming an elongated strip; and folding the strip for forming a narrower ribbon having multiple thicknesses of woven mesh.

25. A method as recited in claim 24 comprising slitting the mesh parallel to one of the warp or weft directions; and folding the strip parallel to the direction of slitting.

26. A method as recited in claim 24 comprising folding the strip so that both slit edges are inside the ribbon.

27. A method as recited in claim 24 comprising slitting the strip parallel to the warp direction and folding the strip parallel to the warp direction.

28. A method as recited in claim 24 comprising rolling the strip into a longitudinal coil having a round transverse cross section and flattening the coil for forming folds and a flattened ribbon.

29. A method as recited in claim 24 wherein the folding step comprises:

folding each edge of the strip toward the middle of the strip; and folding the middle of the strip so that at least a portion of the ribbon has four thicknesses of wire mesh.

* * * * *